April 11, 1967  SUSUMU HANYU ETAL  3,313,257
STITCH CONTROL ARRANGEMENT FOR A ZIG-ZAG SEWING MACHINE
Filed Feb. 6, 1964  7 Sheets-Sheet 1

INVENTORS
Susumu Hanyu
Noboru Kasuga
BY
Michael J. Striker
Atty

INVENTORS
Susumu Hanyu
Noboru Kasuga
BY Michael J. Striker

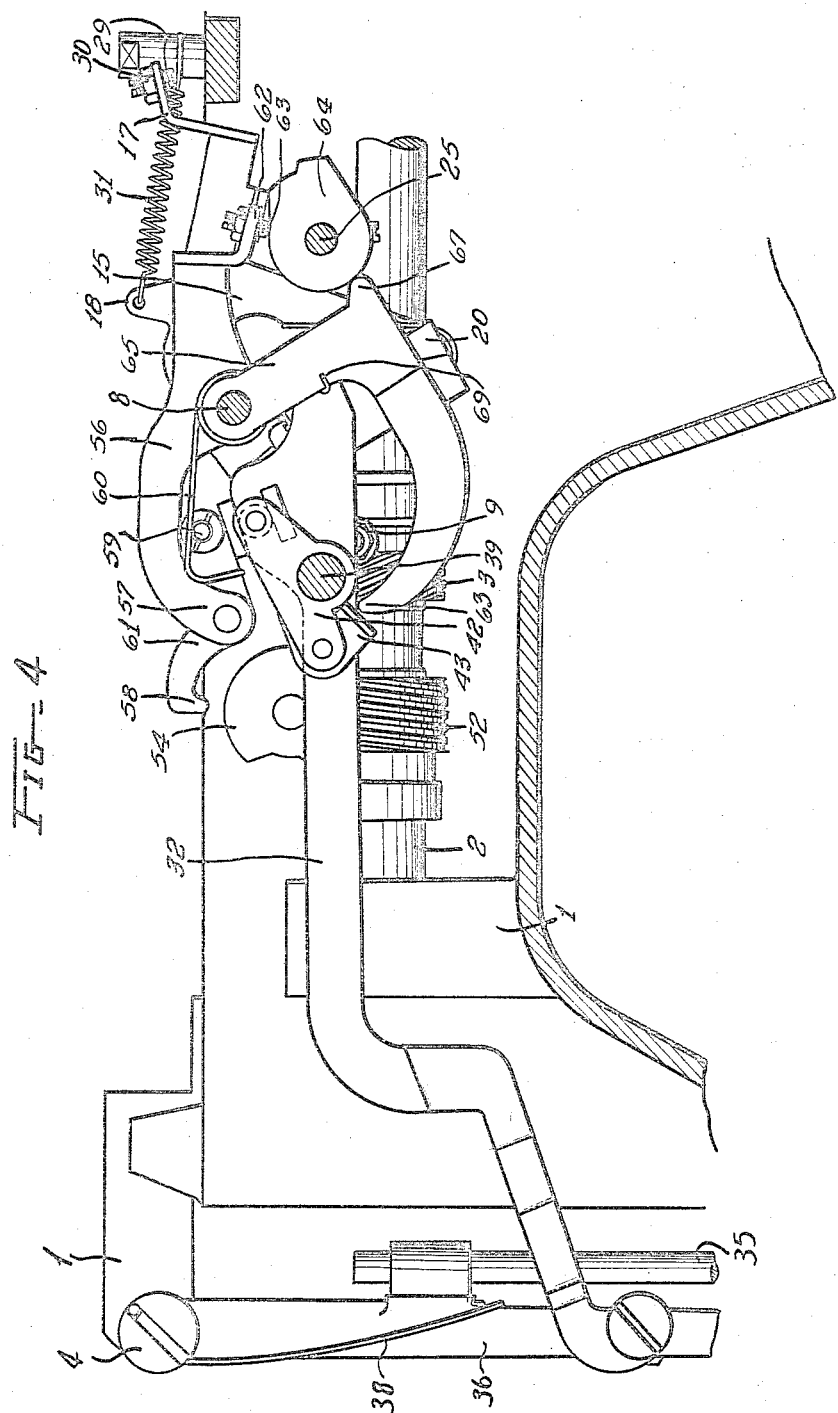

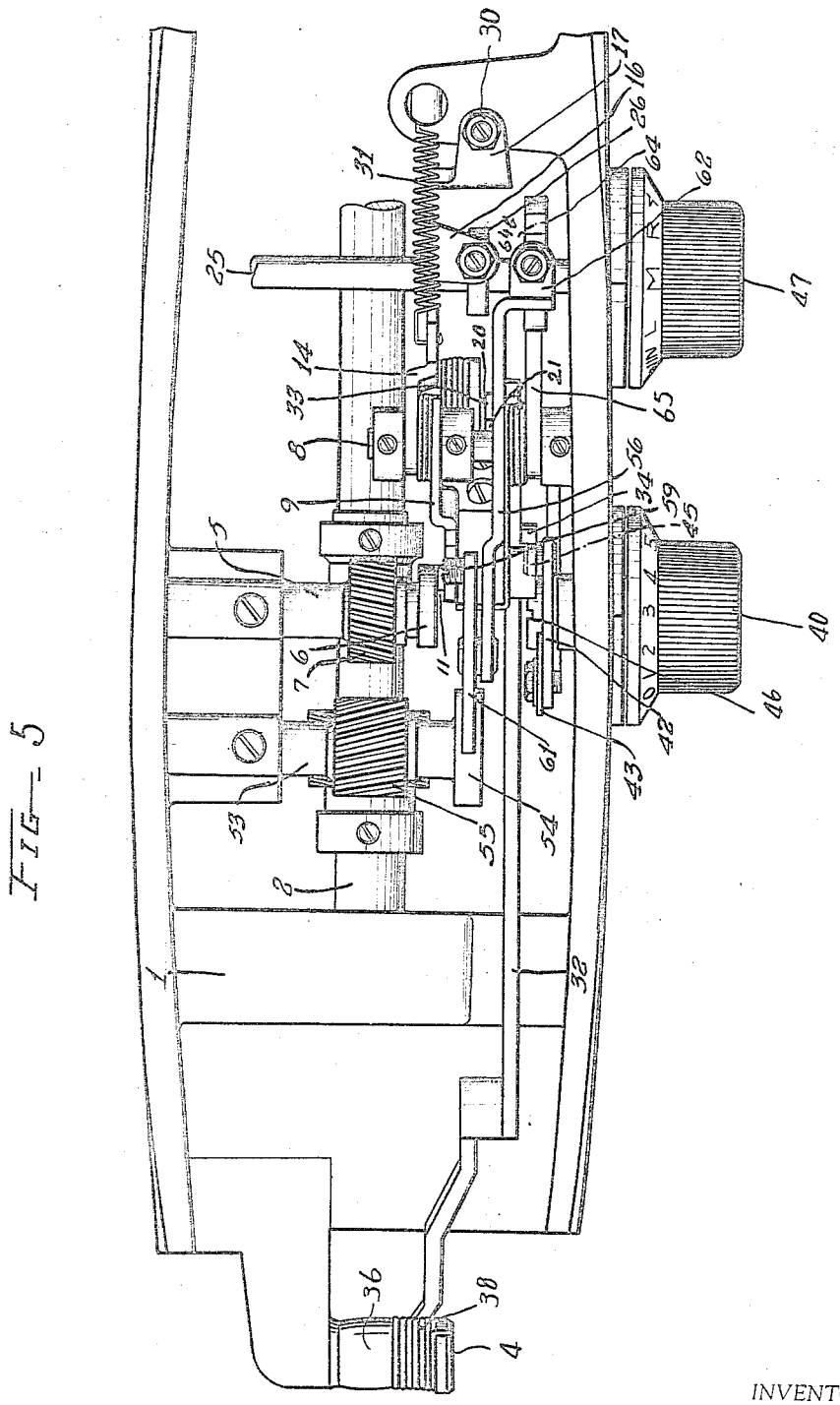

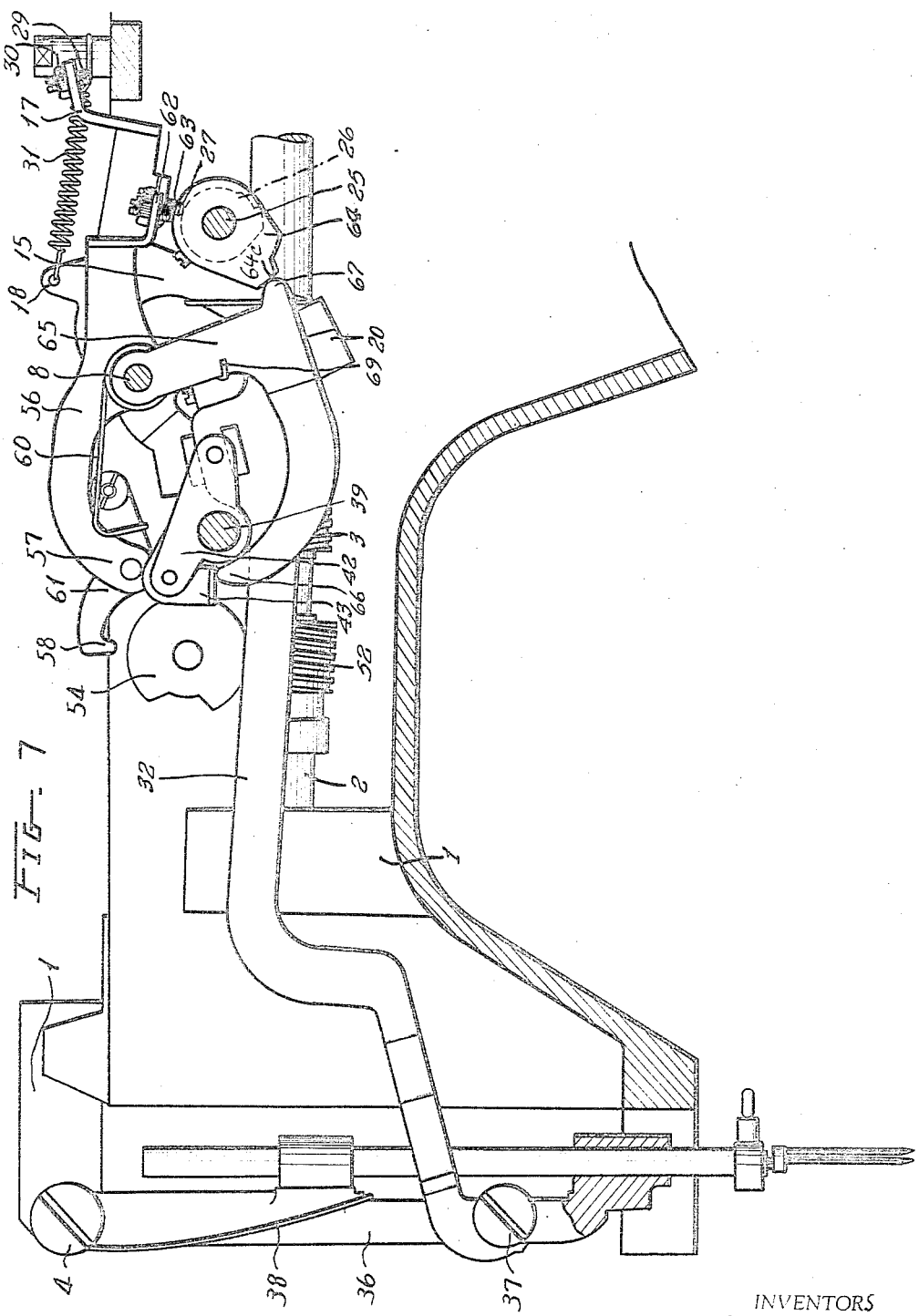

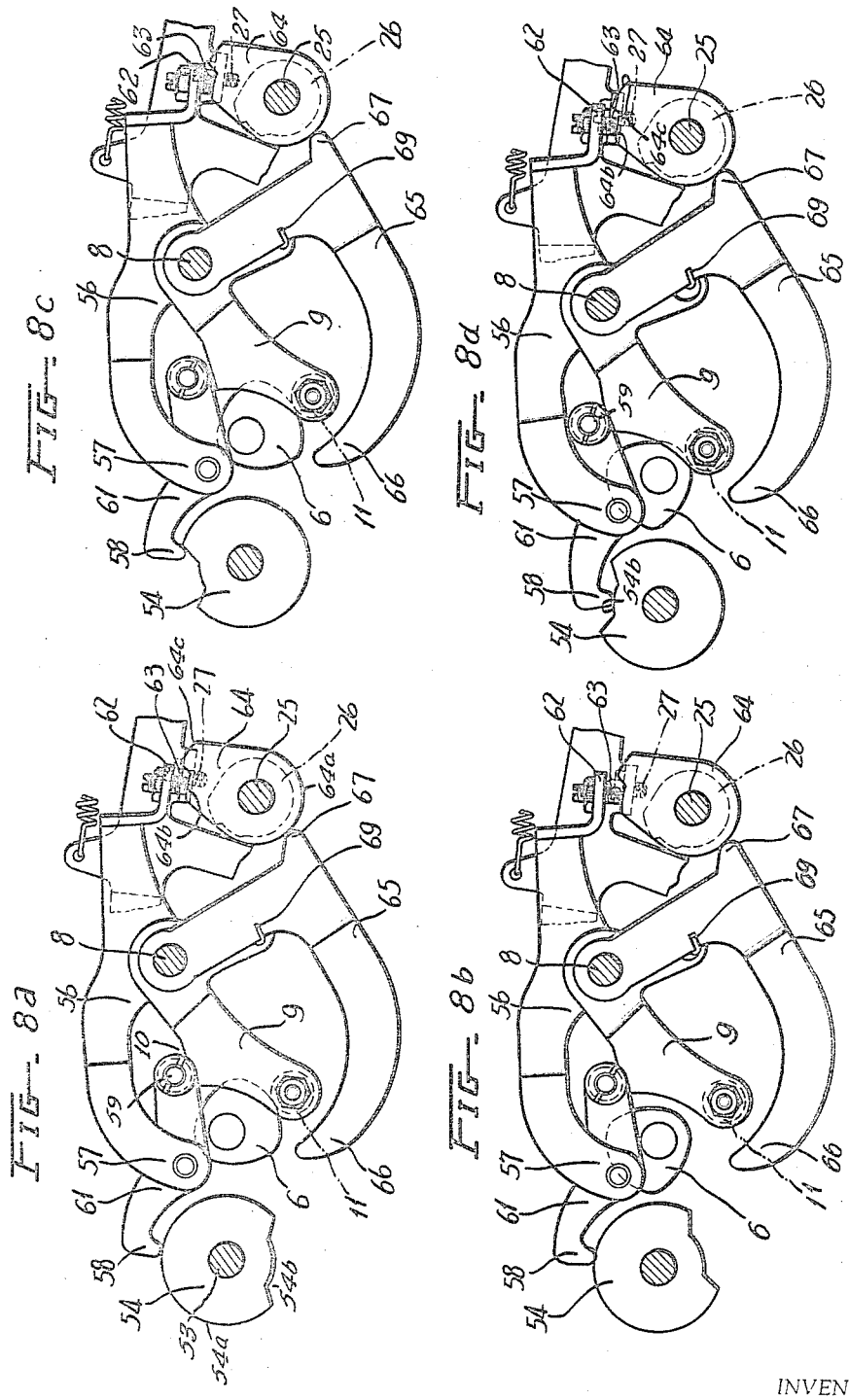

United States Patent Office 3,313,257
Patented Apr. 11, 1967

3,313,257
STITCH CONTROL ARRANGEMENT FOR A ZIG-ZAG SEWING MACHINE
Susumu Hanyu, Hachiooji-shi, and Noboru Kasuga, Koganei-shi, both of Tokyo, Japan, assignors to Janome Sewing Machine Co., Ltd., Chuo-ku, Tokyo, Japan
Filed Feb. 6, 1964, Ser. No. 343,075
19 Claims. (Cl. 112—158)

The present invention relates to a stitch control arrangement for a zig-zag sewing machine, and more particularly to a mechanism permitting by the use of a single control knob to set the sewing machine between a normal condition in which zig-zag stitches of variable amplitude are produced, a condition in which blind stitching is produced, and a position in which the amplitude of oscillation is limited for the purpose of carrying out twin needle sewing operations.

It is one object of the invention to provide a zig-zag sewing machine of simple construction which can be set by operation of a control knob to a condition producing blind stitches including a number of stitches extending in a row in one lateral field position, and single zig-zag stitches of great amplitude.

Another object of the invention is to automatically set the needle bar assembly of a zig-zag sewing machine to a lateral field position when the machine is set to make blind stitching of the type in which several straight stitches are followed by a long transverse zig-zag stitch.

Another object of the present invention is to use the knob by which the machine is set between different field positions, for controlling limiting means by which the stitch amplitude is limited during twin needle operations.

Another object of the present invention is to use the knob by which the machine can be set to blind stitching, for controlling the manually operated stitch amplitude adjusting means in such a manner that only a limited stitch amplitude can be selected during twin needle operations.

The principal object of the invention is to provide a single manually operated means controlling several functions of the sewing machine so that the inexperienced operator is not confused by a greater number of knobs.

Another object of the present invention is to provide a simple and compact mechanism for producing blind stitching by a zig-zag sewing machine.

Another object of the invention is to provide a mechanism in a sewing machine for producing blind stitching in which a number of straight stitches in one lateral field position are followed by a single large amplitude zig-zag stitch extending to the other field position.

With these objects in view, the present invention relates to a stitch control arrangement for a zig-zag sewing machine. One embodiment of the invention comprises a needle bar assembly, preferably to be adapted to be provided with twin needles; field position adjusting means for moving the needle bar assembly between central and lateral field positions; operating means for transversely oscillating the needle bar assembly; control means having an actuated position for controlling the operating means to cyclically vary the amplitude of the oscillating movement of the needle bar assembly; and manually operated means including one knob for moving the field position adjusting means between the field positions, and for actuating the control means to cyclically vary the amplitude of the oscillating movements of the needle bar assembly when the field adjusting means is in a selected lateral field position so that blind stitches are made.

The operating means and control means are driven in synchronism by drive means, such as a drive shaft, and respectively include cams and cam followers. The cam of the control means rotate at a lower speed than the cam of the operating means, and its cam followers engages the cam follower of the operating means only in certain positions of the cam of the control means to prevent the cam follower of the operating means from following the entire cam track so that the amplitude of the needle bar assembly is reduced during a number of stitches, whereupon the cam follower of the operating means is again released whereby the needle bar assembly performs a large amplitude zig-zag stitch as required for blind stitching.

The manually operated means include a control knob having indicia for the left, central and right field positions and being connected to a cam by which the field position adjusting means are controlled. The same control knob has another indicia indicating blind stitching, and controls another cam on whose cam follower the cam follower of the cam of the control means is mounted. A further indicia of the control knob indicates twin needle operations, and when the knob is turned to the respective position, another cam follower is operated to block movement of the manually controlled stitch amplitude adjusting means so that the twin needles cannot be damaged.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 4 is a fragmentary partially sectional front view illustrating a part of the sewing machine provided with a mechanism;

FIG. 5 is a plan view of a sewing machine provided with a mechanism, the top portion of the housing being omitted for the sake of clarity;

FIG. 7 is a fragmentary sectional view of the sewing machine illustrating the mechanism in a second operational position in which the zig-zag movement is limited for carrying out sewing operations with twin needles;

FIGS. 8a, 8b, 8c and 8d are fragmentary front views illustrating successive operational positions of the mechanism during blind stitching.

Figure 6:
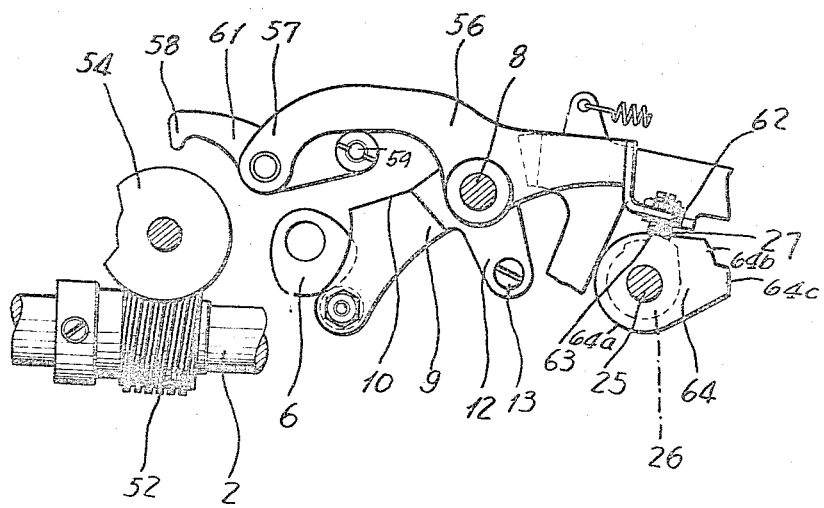
FIG. 6 is a fragmentary front view illustrating a first operational position of the mechanism in which zig-zag stitches are produced.
Figure 6A:
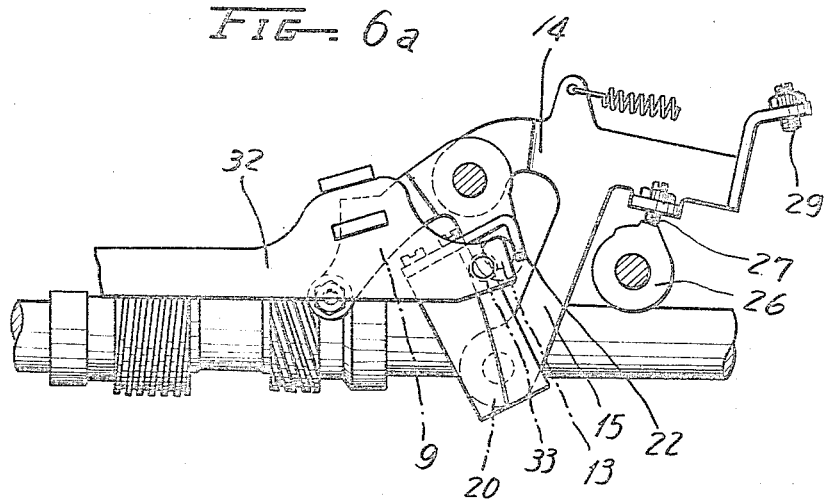
FIG. 6a is a fragmentary front view illustrating a part of the mechanism.

Referring now to the drawings, the basic mechanism for producing zig-zag stitches will first be described. A drive shaft 2 has a worm thread 3 meshing with a worm gear 7 on a shaft 5 which also carries a cam 6 whose shape is best seen in FIG. 6. Cam 6 cooperates with a pin 11 on an oscillatory cam follower 9 which is mounted for turning movement on a stationary shaft 8. Cam follower 9 has a projecting pin 13 inserted under a coupling hook portion 22 secured by screws 23 to the rocking member 20 which is provided with a pin 24 projecting into a corresponding bearing opening at the end of an arm 15 of a field position adjusting means 14. Assuming that the member 14 is held immovable, rocking member 20 will be oscillated about the axis of pin 24 by the cam follower 11, 9, 13. A connecting rod 32 has a follower pin 33 at one end which is slidable along the surface 21 of rocking member 20. Rod 32 has two projections forming a guide channel 34 in which a pin 45 of a lever 42 is located. Lever 42 is mounted on a shaft 39 which is operated by a knob 40. A screw 46 holds adjusting lever 42 in a position fixed to shaft 39. When knob 40 is turned, pin 33 slides on surface 21 toward and away from the axis of rocking member 20 so that the length of the oscillating movement of rod 32 depends on the adjustment of knob 40 whereby the stitch amplitude can be adjusted since connecting rod 32 controls the transverse oscillations of the needle bar assembly 36.

As best seen in FIG. 4 rod 32 is pivotally connected by a pivot screw 37 to needle bar assembly 36 which is mounted on the frame 1 for turning movement about the pivot screw 4. A spring 38 biases the needle bar assembly so that pin 33 of connecting rod 32 will be urged against the slide surface 21 of rocking member 20 and transmits its motion to the connecting rod 32, to the needle bar assembly 36, and to the needle bar 35 which may be provided with means for supporting twin needles as shown in FIG. 7.

The field position of the needle bar assembly can be adjusted between central and lateral positions. Field position adjusting means 14, which turnably carries rocking member 20, has an arm 14 which is mounted on the stationary shaft 8 for turning movement. A spring 31 acting on an arm 18 biases field position adjusting member 14 to turn in clockwise direction as viewed in the drawing. A stop screw 29 secured by a nut 30 to an arm 17 limits such movement in one lateral field position of the needle bar assembly. Another arm 16 supports a shifting cam follower in the form of a screw secured by a nut 28 to field position adjusting means 14, and this cam follower 27 cooperates with an eccentric shifting cam 26 on a shaft 25 which carries a manually operated knob 47 provided with several indicia.

The indicia 48, 49 and 50 represent the characters L, M and R, and are respectively associated with the left center and right field position of the needle bar assembly. When knob 47 is manually turned to the position "L" cam 26 will permit field position adjusting means 14 to assume its position in which pin 24 with rocking member 20 is displaced to the left, and when knob 47 is turned to the positions "M" and "R," cam 26, acting on follower 27 will turn field position adjusting means 14 first to a central position and then to a position in which pin 19 of rocking member 20 is located on the right of the central position.

Due to the displacement of the axis of rocking member 20, the oscillations of the needle bar assembly are made in different field positions, and in each field position, the length of the amplitude of the stitches can be adjusted by knob 40 by moving pin 33 along surface 21 of the rocking member 20, as explained above. Spring 19 biases rocking member 20.

Means are provided for limiting the oscillating movement of the needle bar assembly when the machine is set to operate with twin needles. A stop member 43 is mounted on amplitude adjusting lever 42 by means of a screw 44 and has a curved slot permitting accurate adjustment of its position. A transverse end portion of stop member 43 cooperates with the end portions 66 of a cam follower 65 which is mounted on stationary shaft 8 for turning movement and has a shifting cam follower portion 67 cooperating with shifting cam 64 on shaft 25. Shifting cam 64 has a low circular cam track portion 64a, a shoulder 64b, and a higher shoulder 64c. When the manually operated knob 47 is turned to the position indicated by indicia 70 which represent twin needle operations, shifting cam 64 is turned to the position illustrated in FIG. 7 in which cam portion 64c is operative and sets on the follower portion 67 of member 65 to turn the same to the limiting position shown in FIG. 7 in which turning movement of knob 40 with shaft 39 and amplitude adjusting lever 42 is limited so that the twin needles cannot be damaged.

During the normal zig-zag operations of the sewing machine, shifting cam 64 is in the position illustrated in FIG. 6 in which a cam follower screw secured by a nut 62 to shifting cam follower 56 mounted on shaft 8, is located on the circular cam track portion 64a. Due to the length of the circular cam track portion 64a, the manually operated knob 47 can be turned to the three field positions without displacement of lever 56. However, when knob 47 is turned to the position indicated by indicia 68 which represent a blind stitching operation, shifting cam 64 is turned to the position illustrated in FIGS. 8a to 8d in which cam follower screw 63 abuts the lower shoulder 64b of cam 64. In this position, a blind stitching operation is performed by the needle bar assembly.

Figure 8E:
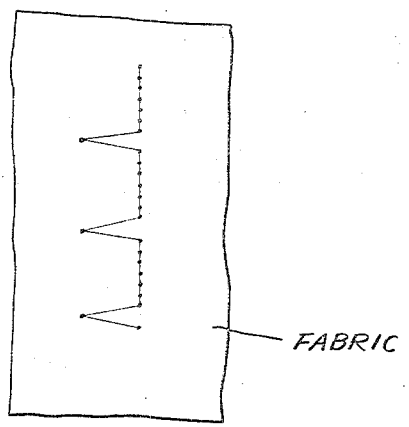
FIG. 8e illustrates a row of stitches produced by the mechanism.

The blind stitching operation produces a row of several stitches, followed by a single large amplitude zig-zag stitch as shown in FIG. 8e.

This operation is controlled by a control cam 54 having a long circular cam track portion 54a, and a short recessed and low cam track portion 54b. Control cam 54 is mounted on a shaft 53 which is driven at low speed from drive shaft 2 through a worm gear transmission 52, 55. The transmission ratio of the transmission 3, 7 by which shaft 5 and operating cam 6 are driven is different, so that cam 6 performs one revolution for two revolutions of drive shaft 2, and cam 54 performs one revolution for eight revolutions of drive shaft 2 corresponding to four revolutions of cam 6.

Figure 1:
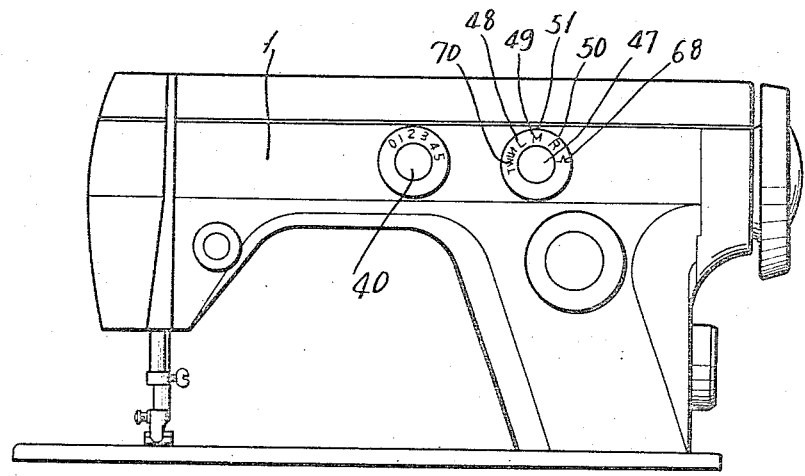
FIG. 1 is an elevation illustrating a sewing machine provided with the mechanism of the invention.
Figure 2:
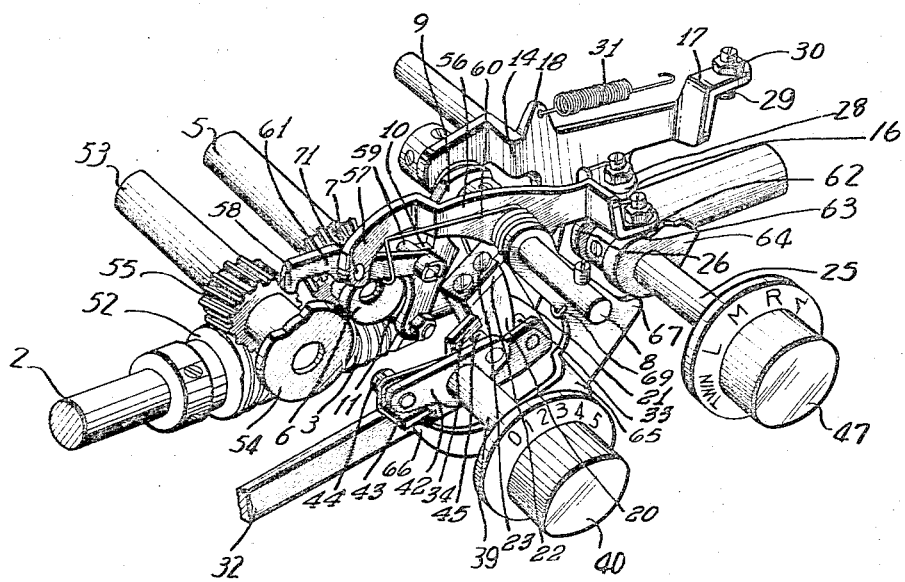
FIG. 2 is a fragmentary perspective view illustrating the mechanism of the invention on a larger scale.
Figure 3:
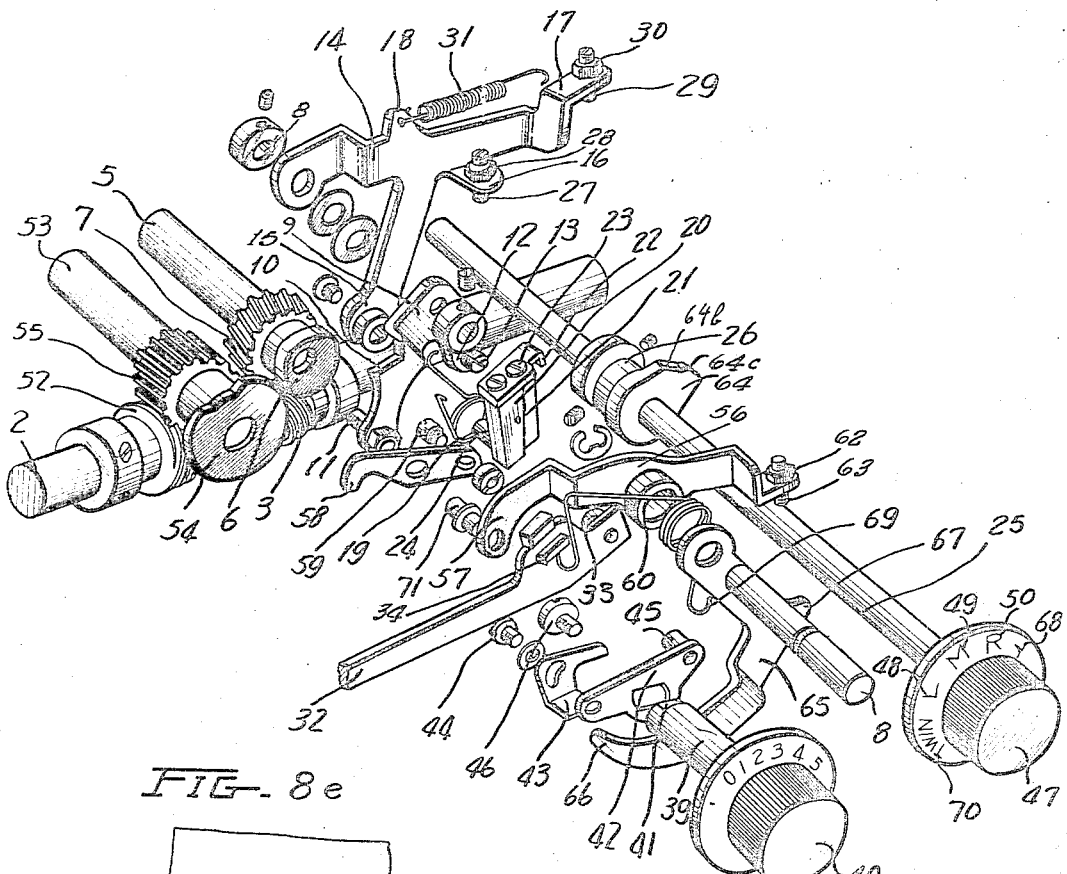
FIG. 3 is a fragmentary perspective exploded view illustrating the mechanism.

Cam follower lever 56 has in addition to its cam follower arm with cam follower screw 63, a carrier arm 57 provided with a pivot 71 on which a double armed control cam follower 61 is mounted for pivotal movement. Cam follower 61 has a follower portion 58 cooperating with the cam track of control cam 54. The other arm of cam follower 61 carries a projecting pin 59 which is located over a shoulder 10 of the previously described oscillatory cam follower 9 whose projecting pin 11 cooperates with operating cam 6. A spring has one arm 60 hooked into this arm of cam follower 61, and its other arm 69 hooked into the limiting cam follower 65, 67. The center of spring 60, 69 is wound about shaft 8, as best seen in FIG. 2.

Due to the action of spring 60, 69 and its arm 60, shifting cam follower 56, 63 is urged into engagement with shifting cam 64, and when cam 64 is in the normal position shown in FIG. 6, arm 57 of shifting cam follower 56 is raised so that oscillatory cam follower 61, 58 is held retracted and spaced from control cam 54 so that the same has no influence on the formation of regular zig-zag stitches which can be made in any field position of the needle bar assembly, and with any desired amplitude which is adjusted by knob 40.

However, when it is desired to operate the machine to make blind stitching, as required for certain hemming operations, and shifting cam 64 is turned by knob 47 to the corresponding position illustrated in FIGS. 8a to 8d, shifting cam follower 56 turns about shaft 8 to the position shown in FIGS. 8a to 8d so that its follower 61 with end portion 58 cooperates with cam 54 in an actuated position, being urged into engagement with the same by spring 69, 60.

In the actuated position shown in FIGS. 8a, 8b, cam follower 61, 58 abuts the long circular cam track portion 54a of control cam 54 and remains in this position during the greater part of one revolution of shaft 53. The control pin 59 of cam follower 61 is urged to a control position, pressing against shoulder 10 of cam follower 9 of operating cam 6 so that cam follower 9 is turned to the inoperative position shown in FIGS. 8a and 8b and held in this position so that it cannot follow operating cam 6 along its entire cam track. Cam follower pin 11 is located along the highest track portion of operating cam 6, but when the same turns to the position shown in FIG. 8b, follower pin 11 cannot engage the lower portion of operating cam 6. Consequently, oscillatory cam follower 9 will not be rocked by operating cam 6 and will not drive rocking member 20 by which the needle bar is oscillated, although the manually operated control knob 40 may be in a position in which the rod 32 and the needle bar assembly would perform the largest amplitude oscillations, if rocking member 20 would perform its full oscillating movement.

Therefore, the machine produces a row of straight stitches, the number of stitches corresponding to the number of revolutions of cam 6 while cam follower 61, 58, cooperates with a circular cam track portion 54a of control cam 54.

After cam 6 has performed four revolutions, for example, cam 54 has turned to the position shown in FIG. 8c and then further turns to the position shown in FIG. 8d. This permits follower portion 58 to move inwardly into a recess 54b of cam 54, so that pin 59 on the other arm of cam follower 61 is raised off shoulder 10 of cam follower 9, permitting cam follower 9 to perform a complete oscillatory movement with cam follower pin 11 moving along the entire track of cam 6 including the low cam portion as shown in FIG. 8d.

Since cam follower 9 is permitted to perform an angular oscillatory movement corresponding to a normal zig-zag operation when cam follower 61 is inoperative, as described with reference to FIG. 6, rocking member 20 will also perform its normal rocking motion and cause a corresponding oscillation of the needle bar assembly. Since the circumferential extension of the recessed portion 54b is short, only a single zig-zag stitch of full amplitude will be carried out in the position shown in FIGS. 8c and 8d, the amplitude of such zig-zag stitch depending only on the adjustment of the stitch amplitude adjusting means 40 and 42.

In this fashion, several straight stitches arranged in a row as shown in FIG. 8e will be produced in the positions shown in FIGS. 8a and 8b, whereupon a single large amplitude zig-zag stitch will be performed in the positions shown in FIGS. 8c and 8d.

It is desired that the row of straight stitches is located in one lateral field position, for example in the right lateral field position of the needle bar assembly. As explained above, the field positions are controlled by field position adjusting means 14 which is influenced by cam 26. Shifting cam 26 for the field positions, and shifting cam 64 for the blind stitching operations and twin needle operations, are operated by the same shaft 25 which is controlled by knob 47. Consequently whenever knob 47 with shaft 25 and cams 26 and 64 is turned to the position shown in FIGS. 8a to 8d in which blind stitching is carried out by the machine, cam 26 shifts the needle bar assembly to the righthand field positions where the straight stitches will appear, whereas the spaced single large amplitude zig-zag stitches will extend to the left from the righthand field position as shown in FIG. 8e. Cam 26 has a higher portion cooperating with follower 27 when shoulder 64b of cam 64 engages follower 63.

From the above description of the structure of the mechanism according to the present invention, it will become apparent that the manually operated means including knob 47, shaft 25, and shifting cams 26, 64 can be set to different positions in which normal sewing operations are carried out in any one of three field positions, while the amplitude of the zig-zag stitches can be adjusted by knob 40 and stitch amplitude adjusting means 42.

In this normal position, shifting cam 64 holds the control means including shifting cam follower 63, 56 and oscillatory cam follower 61 of the blind stitching mechanism in an inoperative position in which the end portion 58 of cam follower 61 cannot cooperate with the control cam 54 of the control means, as shown in FIG. 6.

The operating means including cam 6, the first oscillatory cam follower 9, rocking member 20 and rod 32 cause the needle bar assembly to perform an oscillatory transverse movement whose amplitude can be adjusted by knob 40 and amplitude adjusting lever 42.

By operation of control knob 47, shifting cam follower 63, 56 is shifted by shifting cam 64 to the actuated position shown in FIGS. 8a to 8d in which the second control cam follower 61 is moved by control cam 54 between an inoperative position, see FIG. 8d, in which the first cam follower 9 is controlled by cam 6 to cause normal zig-zag stitching of the machine, and a control position, shown in FIGS. 8a and 8b, in which cam follower 9 of the operating means is prevented from following operating cam 6 so that neither rocking member 20 nor the needle bar assembly is rocked. The respective position of shifting cam 64, see FIGS. 8a to 8d, corresponds to a position of shifting cam 26 in which the field position adjusting means 14 is turned by cam 26 to a position in which rocking member 20 is so displaced that the needle bar assembly assumes the righthand lateral field position which is desired for performing blind stitching.

When operation with twin needles is desired, knob 47 is turned to the corresponding position so that the highest shoulder 64c of shifting cam 64 is effective in the position shown in FIG. 7 whereby limiting means including blocking cam follower 65, 66, 67 are turned by shifting cam 64 to a position abutting the adjustable member 43 of the amplitude adjusting lever 42 so that movement of the same under the control of knob 40 is limited, as is desired for twin needle operations.

The manually operated control knob 47 according to the present invention permits even an inexperienced operator to use the machine for different operations, as described above, preventing in a completely foolproof manner every erroneous setting of the machine which may cause damage to movable parts of the machine. The blind stitching operation is fully automatically carried out when the machine is set by operation of knob 47, and requires no particular skill of the operator. However, the machine can be set in the same simple manner to normal zig-zag stitching, or to straight stitching, or to twin needle operations.

It will be understood that each of the elements described above or two or more together, may also find a useful application in other types of zig-zag sewing machines differing from the machine described above.

While the invention has been illustrated and described as embodied in an automatic mechanism for shifting a sewing machine between conditions producing zig-zag stitches in selected field positions, and blind stitching in one selected lateral field position by means of a single knob, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a zig-zag sewing machine, in combination, a needle bar assembly; field position adjusting means for moving the needle bar assembly between central and lateral field positions; operating means for transversely oscillating the needle bar assembly; control means having an actuated position for controlling the operating means to cyclically vary the amplitude of the oscillating movement of the needle bar assembly so that a plurality of consecutive straight stitches are followed by a zig-zag stitch; and manually operated means including one knob having a plurality of positions for moving the field position adjusting means between said field positions and for actuating said control means when said field adjusting means is in a selected lateral field position whereby blind stitches are made.

2. In the zig-zag sewing machine, in combination, a needle bar assembly; field position adjusting means for moving said needle bar assembly between central and lateral field positions; drive means; operating means driven by said drive means and operatively connected to said needle bar assembly for transversely oscillating the same; control means including a control element movable to and from an actuated position in which said control element is driven by said drive means to cyclically move between an inoperative position and a control position for controlling said operating means to cyclically vary the amplitude of the oscillating movement of said needle bar assembly between straight stitches and zig-zag stitches; and one manually operated means operatively connected with said field position adjusting means for moving the same between said field positions, and with said control means for moving said control element to and from said actuated position, and for holding the same in said actuated position when said field adjusting means is in a selected field position.

3. In a zig-zag sewing machine, in combination, a needle bar assembly; field position adjusting means for moving said needle bar assembly between central and lateral field positions; drive means; operating means driven by said drive means and operatively connected to said needle bar assembly for transversely oscillating the same; control means including a control element movable to and from an actuated position in which said control element is driven by said drive means to cyclically move between an inoperative position and a control position for controlling said operating means to cyclically vary the amplitude of the oscillating movement of said needle bar assembly between straight stitches and zig-zag stitches; limiting means having an inoperative position and a limiting position controlling said operating means for limiting the amplitude of the oscillating movement of said needle bar assembly; and one manually operated knob operatively connected with said field position adjusting means for moving the same between said field positions, with said control means for moving said control element to and from said actuated position, and for holding the same in said actuated position when said field adjusting means is in a selected field position, and with said limiting means for moving the same to said limiting position while said field adjusting means is in said selected field position.

4. In a zig-zag sewing machine, in combination, a needle bar assembly including means for supporting twin needles; field position adjusting means for moving said needle bar assembly between central and lateral field positions; drive means; operating means driven by said drive means and operatively connected to said needle bar assembly for transversely oscillating the same; control means driven by said drive means and having an inoperative position and a control position controlling said operating means to cyclically vary the amplitude of the oscillating movement of said needle bar assembly between zero and a great amplitude for blind stitching; limiting means having an inoperative position and a limiting position controlling said operating means for limiting the oscillating movement of said needle bar assembly; and a manually operated means including a knob having indicia for indicating said field positions, blind stitching, and twin needle operations operatively connected with said field position adjusting means for moving the same between said field positions, with said control means for actuating the same when said field adjusting means is in a selected lateral field position, and with said limiting means for moving the same to said limiting position before twin needle operations while said field adjusting means is in said selected field position.

5. In a zig-zag sewing machine, in combination, a needle bar assembly; drive means; operating means including a first cam driven from said drive means, and a first cam follower operatively connected to said needle bar assembly for oscillating the same; control means including a second cam driven from said drive means, and a second cam follower having an actuated position in which said second cam follower is controlled by said second cam to cyclically move between an inoperative position and a control position, said second cam follower in said control position engaging and at least partly preventing said first cam follower from following said first cam so as to reduce the amplitude of said oscillating movement of said needle bar assembly; and a manually operated means operatively connected with said second cam follower for moving the same to and from said actuated position.

6. In a zig-zag sewing machine, in combination, a needle bar assembly; drive means; operating means including a first cam driven from said drive means at a first rotary speed, and a first cam follower operatively connected to said needle bar assembly for oscillating the same; control means including a second cam driven from said drive means at a second rotary speed lower than said first rotary speed, and a second cam follower having an actuated position in which said second cam follower is controlled by said second cam to cyclically move between an inoperative position and a control position, said second cam follower in said control position engaging and at least partly preventing said first cam follower from following said first cam so as to reduce the amplitude of said oscillating movement of said needle bar assembly; and a manually operated means operatively connected with said second cam follower for moving the same to and from said actuated position.

7. In a zig-zag sewing machine, in combination, a needle bar assembly; field position adjusting means for moving said needle bar assembly between central and lateral field positions; drive means; operating means including a first cam driven from said drive means, and a first cam follower operatively connected to said needle bar assembly for oscillating the same; control means including a second cam driven from said drive means, and a second cam follower having an actuated position in which said second cam follower is controlled by said second cam to cyclically move between an inoperative position and a control position, said second cam follower in said control position engaging and at least partly preventing said first cam follower from following said first cam so as to reduce the amplitude of said oscillating movement of said needle bar assembly; and a manually operated means operatively connected with said field position adjusting means for moving the same between said field positions, and with said second cam follower for moving the same to and from said actuated position and for holding the same in said actuated position movable between said inoperative position and said control position when said field adjusting means is in a selected field position.

8. In a zig-zag machine, in combination, a needle bar assembly; field position adjusting means for moving said needle bar assembly between central and lateral field positions; drive means; operating means including a first cam driven from said drive means at a first rotary speed, and a first cam follower operatively connected to said needle bar assembly for oscillating the same; control means including a second cam driven from said drive means at a second rotary speed lower than said first rotary speed, and a second cam follower having an actuated position in which said second cam follower is controlled by said second cam to cyclically move between an inoperative position and a control position, said second cam follower in said control position engaging and at least partly preventing said first cam follower from following said first cam so as to reduce the amplitude of said oscillating movement of said needle bar assembly; and a manually operated means operatively connected with said field position adjusting means for moving the same between said field positions, and with said second cam follower for moving the same to and from said actuated position and for holding the same in said actuated position movable between said inoperative position and said control position when said field adjusting means is in a selected field position.

9. In a zig-zag sewing machine, in combination, a needle bar assembly including means for supporting twin needles; field position adjusting means for moving said needle bar assembly between central and lateral field positions; drive means; operating means including a first cam driven from said drive means, and a first cam follower operatively connected to said needle bar assembly for oscillating the same; amplitude adjusting means for adjusting the amplitude of the oscillation of said assembly and of the zig-zag stitches produced by the same; limiting means having a limiting position limiting movement of said amplitude adjusting means in a position corresponding to a selected stitch amplitude; control means including a second cam driven from said drive means, and a second cam follower having an actuated position in which said second cam follower is controlled by said second cam to cyclically move between an inoperative position and a control position, said second cam follower in said control position engaging and preventing said first cam follower from following said first cam so as to reduce the amplitude of said oscillating movement of said needle bar assembly to a minimum amplitude, while in said inoperative position of said second cam follower said needle bar assembly performs zig-zag movements having an amplitude set by said adjusting means as required for blind stitching; and a manually operated means including a knob having indicia means for indicating said field positions, blind stitching, and twin needle operations, said knob being operatively connected with said field position adjusting means for moving the same between said field positions, with said second cam follower for moving the same to and from said actuated position and for holding the same in said actuated position movable between said inoperative position and said control position when said field adjusting means is in a selected lateral field position, and with said limiting means for moving the same to said limiting position before twin needle operations while said field adjusting means is in a selected field position so that stitches made by said twin needles do not exceed said selected amplitude.

10. In a zig-zag sewing machine, in combination, a needle bar assembly; field position adjusting means for moving said needle bar assembly between central and lateral field positions; drive means; operating means driven by said drive means and operatively connected to said needle bar assembly for transversely oscillating the same; control means including a control element movable to and from an actuated position in which said control element is driven by said drive means to cyclically move between an inoperative position and a control position controlling said operating means to cyclically vary the amplitude of the oscillating movement of said needle bar assembly between straight stitches and zig-zag stitches; and a manually operated means including one knob, a first shifting cam and a cam follower controlled by said knob and operatively connected with said field position adjusting means for moving the same between said field positions, a second shifting cam and a cam follower operatively connected with said control means for moving said control element to and from said actuated position, and for holding the same in said control position when said field adjusting means is in a selected field position.

11. In a zig-zag sewing machine, in combination, a needle bar assembly; field position adjusting means for moving said needle bar assembly between central and lateral field positions; drive means; operating means driven by said drive means and operatively connected to said needle bar assembly for transversely oscillating the same; control means driven by said drive means and having an inoperative position and a control position controlling said operating means to cyclically vary the amplitude of the oscillating movement of said needle bar assembly; limiting means having an inoperative position and a limiting position controlling said operating means for limiting the oscillating movement of said needle bar assembly; and a manually operated means including a first shifting cam and a cam follower operatively connected with said field position adjusting means for moving the same between said field positions, a second shifting cam and a cam follower operatively connected with said control means for actuating the same when said field adjusting means is in a selected field position, and with said limiting means for moving the same to said limiting position while said field adjusting means is in said selected field position.

12. In a zig-zag sewing machine, in combination, a needle bar assembly; field position adjusting means for moving said needle bar assembly between central and lateral field positions; drive means; operating means including a first oscillatory cam driven from said drive means, and a first cam follower operatively connected to said needle bar assembly for oscillating the same; control means including a second cam driven from said drive means, and a second control cam follower having an actuated position in which said second cam follower is controlled by said second cam to cyclically move between an inoperative position and a control position, said second cam follower in said control position engaging and at least partly preventing said first cam follower from following said first cam so as to reduce the amplitude of said oscillating movement of said needle bar assembly; limiting means having an inoperative position and a limiting position controlling said operating means for limiting the oscillating movement of said needle bar assembly; and a manually operated means including a first shifting cam and a first shifting cam follower operatively connected with said field position adjusting means for moving the same between said field positions, a second shifting cam and a second shifting cam follower operatively connected with said second cam follower for moving the same to and from said actuated position and for holding the same in said actuated position movable between said inoperative position and said control position when said field adjusting means is in a selected field position, and a third shifting cam follower cooperating with said second shifting cam and operatively connected with said limiting means for moving the same to said limiting position while said field adjusting means is in a selected field position.

13. In a zig-zag sewing machine, in combination, a needle bar assembly including means for supporting twin needles; field position adjusting means for moving said needle bar assembly between central and lateral field positions; drive means; operating means including a first oscillatory cam driven from said drive means, and a first cam follower operatively connected to said needle bar assembly for oscillating the same; control means including a second control cam driven from said drive means, and a second cam follower having an actuated position in which said second cam follower is controlled by said second cam to cyclically move between an inoperative position and a control position, said second cam follower in said control position engaging and preventing said first cam follower from following said first cam so as to reduce the amplitude of said oscillating movement of said needle bar assembly for producing straight stitches, while in said inoperative position of said second cam follower said needle bar assembly performs zig-zag movements of an amplitude required for blind stitching; and a manually operated means including a knob having indicia means for indicating said field positions, blind stitching, and twin needle operations, a first shifting cam and a first shifting cam follower operatively connected with said field position adjusting means for moving the same between said field positions, a second shifting cam and a second shifting cam follower operatively connected with said second cam follower for moving the same to and from said actuated position and for holding the same in said actuated position movable between said inoperative position and said control position when said field adjusting means is in a selected lateral field position, and a third shifting cam follower controlled by said second shifting cam and operatively connected with said limiting means for moving the same to said limiting position before twin needle operations while said field adjusting means is in a selected field position.

14. A mechanism as set forth in claim 13 including manually controlled stitch amplitude adjusting means; and wherein said third shifting cam follower limits movement of said stitch amplitude adjusting means in said limiting position.

15. In a zig-zag sewing machine, in combination, a needle bar assembly; field position adjusting means for moving said needle bar assembly between central and lateral field positions; drive means; operating means including a first cam driven from said drive means at a first rotary speed, and a first cam follower operatively connected to said needle bar assembly for oscillating the same; control means including a second cam driven from said drive means at a second rotary speed lower than said first rotary speed, and a second cam follower having an actuated position in which said second cam follower is controlled by said second cam to cyclically move between an inoperative position and a control position, said second cam follower in said control position engaging and at least partly preventing said first cam follower from following said first cam so as to reduce the amplitude of said oscillating movement of said needle bar assembly; and a manually operated means including a first shifting cam and a cam follower operatively connected with said field position adjusting means for moving the same between said field positions, and a second shifting cam and a cam follower operatively connected with said second cam follower of said control means for moving the same to and from said actuated position, and for holding the same in said actuated position movable between said inoperative position and said control position when said field adjusting means is in a selected field position.

16. A mechanism as set forth in claim 15 wherein said cam follower of said second shifting cam supports said second cam follower in said actuated position for turning movement between said inoperative and control positions thereof, and is movable to a position in which said second cam follower is retracted from said second cam.

17. A mechanism as set forth in claim 16 wherein said first cam follower is engaged by said second cam follower in said control position while the same moves along a long higher circular cam track portion of said second cam so that said first cam follower cannot follow said first cam whereby said needle assembly is prevented from making zig-zag stitches, said second cam having a short low cam track portion controlling said second cam follower to assume said inoperative position so as to permit oscillation of said first cam follower so that said needle bar assembly performs one zig-zag stitch during a blind stitching operation.

18. A mechanism as set forth in claim 17 comprising means for adjusting the amplitude of said transverse oscillation of said assembly independently of the operation of said manually operated means.

19. A mechanism as set forth in claim 17 including first and second transmission means connecting said first and second cams with said drive shaft, said first and second transmission means having different ratios.

References Cited by the Examiner
UNITED STATES PATENTS
2,862,468   12/1958   Johnson _____ 112—158

JORDAN FRANKLIN, *Primary Examiner.*

RICHARD J. SCANLAN, *Examiner.*